No. 758,883. PATENTED MAY 3, 1904.
J. N. ALSOP.
METHOD OF GENERATING GASEOUS MEDIUMS FROM AIR.
APPLICATION FILED MAY 29, 1903.
NO MODEL. 2 SHEETS—SHEET 1.
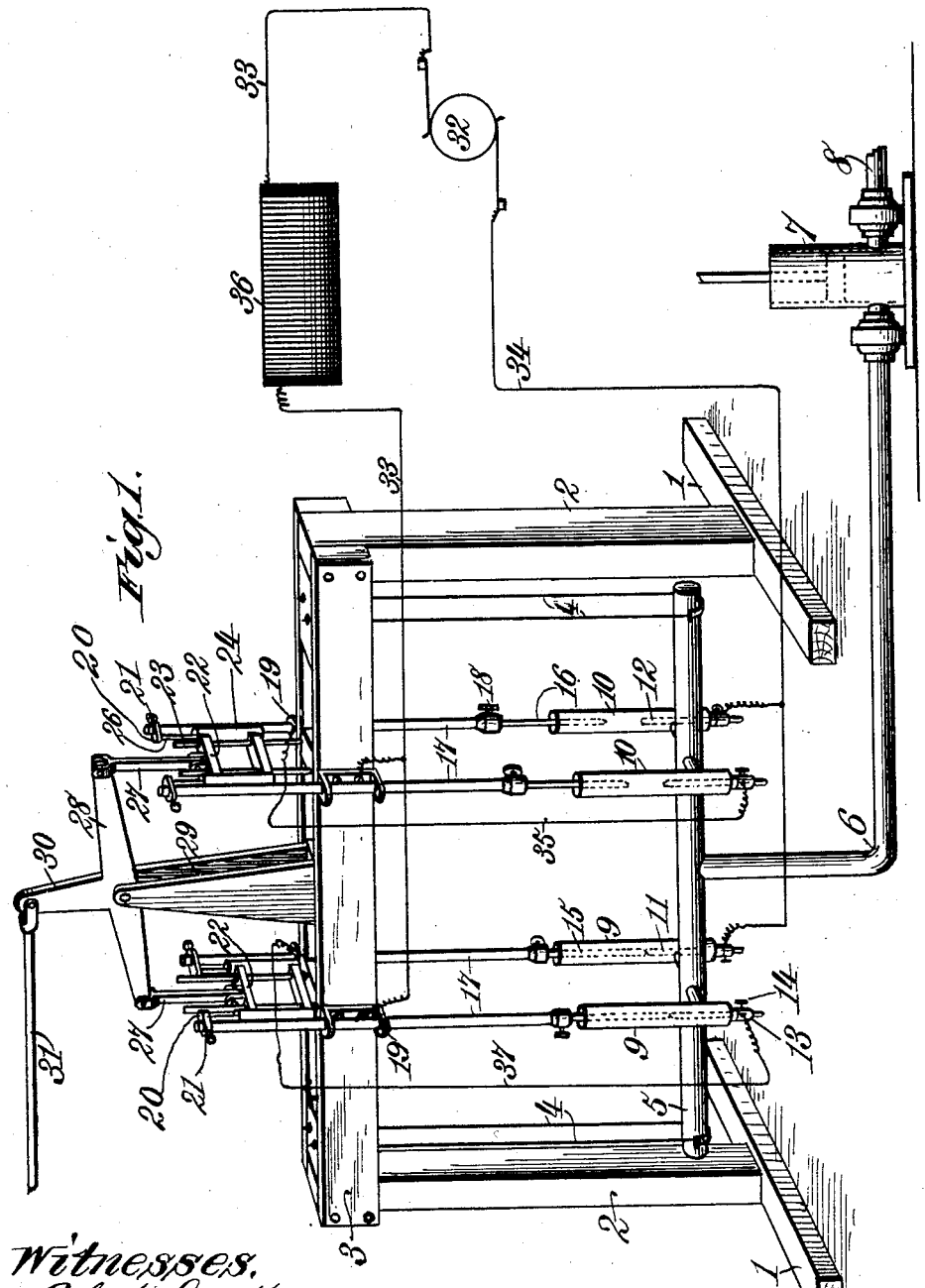

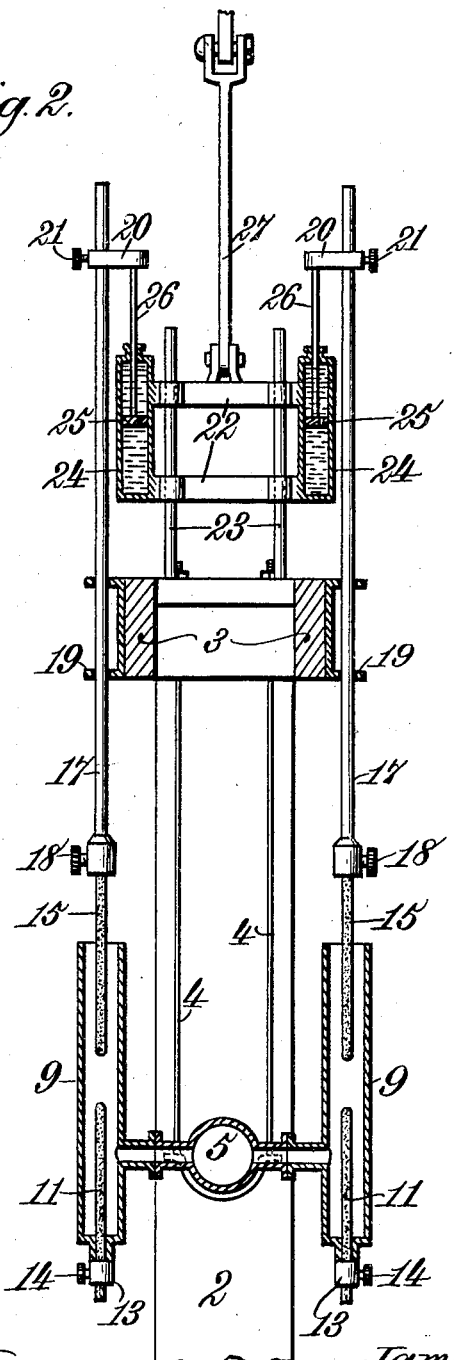

No. 758,883. Patented May 3, 1904.

UNITED STATES PATENT OFFICE.

JAMES N. ALSOP, OF OWENSBORO, KENTUCKY.

METHOD OF GENERATING GASEOUS MEDIUMS FROM AIR.

SPECIFICATION forming part of Letters Patent No. 758,883, dated May 3, 1904.

Application filed May 29, 1903. Serial No. 159,382. (No specimens.)

*To all whom it may concern:*

Be it known that I, JAMES N. ALSOP, a citizen of the United States, residing at Owensboro, in the county of Davis and State of Kentucky, have invented new and useful Improvements in Methods of Generating Gaseous Mediums from Air, of which the following is a specification.

My invention relates to a method of generating a gaseous medium by means of an electric arc or flame for use in the treatment of flour, and has for its object a novel manner of continuously producing in succession a series of arcs, maintaining the same for a given period, and then dissipating them.

The invention has for a further object a novel manner of producing a gaseous medium by forming in the presence of air an arc or a series of arcs and in successively dissipating the respective arcs.

The invention has for a further object the production of a gaseous medium by forming an arc and in a novel manner increasing the potential of the current maintaining the arc. I am not able to identify accurately by chemical formula this gaseous medium. It has been determined by chemical analysis, however, that air treated in the manner hereinafter described contains nitrogen peroxid ($NO_2$ or $N_2O_4$) and traces of ozone ($O_3$) and is in a state of ionization. It is the aim of my invention to produce this gaseous medium, which I have discovered possesses certain valuable properties hereinafter referred to, in an economical manner in large quantities for commercial use, and I carry out the method forming the subject-matter of this invention by means of the apparatus illustrated in the accompanying drawings, in which—

Figure 1 is a perspective view of an apparatus constructed according to my invention; and Fig. 2 is an enlarged transverse sectional view through one of the two sets of the generating apparatus shown in Fig. 1, certain parts being in elevation.

Referring now to the drawings, 1 indicates the base-blocks of a frame comprising uprights 2 and transverse supporting-beams 3, which latter support in any suitable manner by means of rods 4 a conduit 5, closed at its ends and connected centrally to a pipe 6, which in turn is operatively connected to an air-pump 7, having an eduction-pipe 8. Communicating with and extending upward from the conduit 5 on each side of the pipe 6 are a series of tubes opened at one end, in the arrangement shown two of such tubes being located at each side of the pipe 6 and indicated, respectively, by the numerals 9 and 10. Extending upward through the lower end of each tube is an electrode, (indicated, respectively, by the numerals 11 11 and 12 12,) said electrodes being adjustably supported in holders 13 by means of set-screws 14. Extending downward through the upper end of each tube is a movable electrode, these electrodes being indicated, respectively, by the numerals 15 15 and 16 16. The electrodes 15 16 are supported in an automatically-adjustable manner, as illustrated in Fig. 2, and in the manner now to be described.

17 indicates movable supports, in the lower ends of which the electrodes 15 16 are secured by means of binding-screws 18. Said supports are slidably mounted in guides 19, secured to the transverse frame members 3, and at their upper ends are adjustably secured in plates 20 by means of the binding-screws 21, said plates 20 being of non-conducting material.

22 indicates a frame or cross-head which is adapted to have a vertical movement on guide-rods 23, mounted in an upright position on the frame of the machine, said cross-head or frame 22 carrying at opposite sides cylinders 24, which are adapted to contain oil. Working in each of said cylinders is a piston 25, which is connected by a piston-rod 26 to the plate 20. The pistons 25 are each provided with small holes to allow the oil to pass to the upper side of the pistons for a purpose hereinafter described.

27 27 indicate pitmen which are connected at their lower ends to the respective cross-heads 22 and at their upper ends are connected to opposite ends of a walking-beam 28, which is centrally and pivotally mounted on a support 29, rising from the frame of the machine. The walking-beam 28 is provided with a central projecting arm 30, pivotally secured to which is a rod 31, by means of which the walking-beam is adapted to be rocked back and forth in the usual manner, the rod 31 being reciprocated by any suitable mechanical means—such as a crank, eccentric, or the like—which means need not be particularly referred to.

It will be understood that the apparatus illustrated in Fig. 2 as applied to the tubes 9 9 is identical with the apparatus applied to the tubes 10 10, and from Fig. 1 it will be seen that as the walking-beam is operated one set of electrodes—say 15—will be moved downward, while the other set, 16, will be moved upward.

Referring now again to Fig. 2, it will be seen that in the downward movement of the pitman 27 the cylinders 24 will be carried downward, thus permitting the supports 17, which are carried by the piston-rods 26, to fall by gravity, this downward movement of the supports 17 being assisted by the partial vacuum which will be formed in the cylinders 24 in such downward movement. This continues until the electrodes 15 come in contact with the electrodes 11. As the pitman 27 is raised the pressure of the oil on the under side of the pistons 25 will also operate to raise the supports 17 and withdraw the electrodes 15 from the electrodes 11. As in the operation of my apparatus I produce an arc or flame when the electrodes are drawn apart, it follows that said electrodes will burn away and become shorter, and unless some means were provided for compensating for this shortening of the electrodes they would soon fail to come in contact in the downward movement of the pitman 27, and hence the arc would not be formed. It will be seen that I provide for automatically adjusting the fall of the electrodes 15 and 16 to compensate for the burning away by the construction above described, in which the electrodes are supported by the pistons 25 upon a body of oil in the cylinders 24. As each piston 25 is provided with a small hole, as the electrodes 15 and 16 shorten the pistons will settle farther down in the cylinders, the oil passing through the small opening therein to the upper side. The above construction not only provides for an automatic adjustment of the movable electrodes, but it also insures a yielding contact of the electrodes, with the consequent advantage that breaking of the same in the act of contact is avoided. This latter feature would be of importance only in cases where carbon or other relatively soft electrodes were employed. In practice I employ metal electrodes, and hence the element of breakage has not to be considered.

The current for producing the arcs between the electrodes is supplied by a constant-potential dynamo 32, from which the current is led by wires 33 and 34. Each set of tubes 9 9 and 10 10, respectively, is connected up in series, and the wiring of the same from the dynamo will be readily understood and need be but briefly referred to. Beginning with the wire 34, said wire passes to the electrode 12 of one of the tubes 10 and then over to the electrode 11 of one of the tubes 9. The stationary electrode 12 of the other tube 10 is electrically connected by a wire 35 to the movable electrode 16 of the first tube 10. The other wire, 33, from the dynamo leads to a coil 36 having high self-induction and then leads from said coil and is electrically connected to the movable electrodes 15 16 of the corresponding tubes 9 10. A wire 37 connects the stationary electrode 11 of this latter tube 9 with the movable electrode 15 of the other tube 9. Thus tracing the circuit through the set of tubes shown to the right of Fig. 1 and assuming that the electrodes 16 are in contact with the electrodes 12, the current passes from the dynamo 33 through the wire 34 to the electrode 12, to which said wire is connected, thence through the electrode 16 and its support 17 to the wires 35, thence to the electrode 12 of the other tube 10 and through the electrode 16 and support 17 to the wire 33, and thence through the induction-coil 36 back to the dynamo. When the opposite electrodes 15 and 11 are brought together, the current will be short-circuited through these electrodes and pass in series therethrough, as just described with reference to the tubes 10.

The operation of the apparatus as thus far described is as follows: Assuming the parts to be in the positions shown in Fig. 1, the current is now passing through the respective electrodes 11 and 15. As the walking-beam 28 is operated to raise the electrodes 15 an arc is formed between the electrodes 15 and 11 and the gaseous medium will be generated in the tubes 9. This gaseous medium is withdrawn from said tubes by means of the action of the air-pump 7 and is delivered by said air-pump through the eduction-pipe 8 to the place of use or storage. As the electrodes 15 continue to rise the electrodes 16 will of course be correspondingly lowered, and the arc between the electrodes 15 and 11 will be maintained until the electrodes 16 come in contact with the electrodes 12, when the current will be short-circuited to the tubes 10 and the arc between the electrodes 15 and 11 will be extinguished. The same operation will be repeated as the electrodes 16 are raised, the arc being maintained until the electrodes 15 and 11 come in contact or into the position in which they are shown in the drawings, when the current will be again short-circuited to the tubes 9 and the arcs between the electrodes 16 and 12 will be extinguished. I can employ a current of very low potential for this purpose, as in the operation of my machine the electrodes are brought into actual contact and then drawn apart to draw out the arc and the current does not have initially to span a given space with the necessity of thereby overcoming the great resistance to its passage formed by the air. I have found, however, that with a low-potential current some means must be provided for feeding the arc, or, in other words, to meet the increased resistance offered as the electrodes are moved farther apart. This requirement I meet by the introduction into the circuit of a coil having high self-induction, the action of which is as follows: When either pair of the electrodes in the tubes are brought together, thereby causing short-circuit of the electrifying apparatus, the coil 36 is excited to a high degree of magnetism, and as the electrodes are pulled apart and are followed by the arc or flash, which increases the resistance of the circuit, the strength of the magnetism of the coil will be diminished. This change in the strength of magnetism generates an extra current in the circuit or coil in the same direction as the original current and proportional in strength to the magnetic change, all as is well known. As the electrodes are drawn apart to form arcs the resistance of the circuit is additionally increased, causing the strength of magnetism in the coil to be additionally diminished, thereby causing the potential at the electrodes to rise to the necessary strength to meet the resistance of the air or gas between them as the distance between the electrodes is increased until the opposite pair of electrodes are brought together and short-circuits said arcs.

The principle of operation of the self-induction coil 36 will be seen to be that of inducing currents in the circuit, and by this means I am enabled to secure the potential necessary to overcome the resistance between the separated electrodes, and thus maintain the arc, while employing a dynamo generating currents of relatively low potential.

The amount of the gaseous medium generated in a given time will be in proportion to the number of amperes of electricity used, the potential at which the current is passed through the apparatus, and the amount of air drawn through the tubes by the air-pump.

A distinguishing feature of my invention is the fact that the electrodes are brought into actual contact to start the arc. This contact lasts for an appreciable length of time, and the time during which the electrodes are in actual contact is sufficient to enable the coil 36 to become thoroughly saturated with electricity. As a result when the electrodes are separated to draw off the arc the potential of the current is increased in the manner heretofore explained, and not only so, but the arc is fed with current and prevented from appreciable attenuation and maintained at a practically uniform density, which is the maximum density obtainable at the time. This may be further explained by stating that in practice the arc drawn off rarely exceeds four and one-half inches in length, whereas with a machine operating under the conditions herein described an arc eighteen inches long can be drawn off before the arcing distance is passed. Thus it will be seen that I produce an arc, maintain the same at its maximum density and without appreciable attenuation, and short-circuit the arc while in this condition.

While I have shown and described the tubes 9 and 10 as arranged in sets of two each, it will be obvious that I can employ any desired number of tubes, beginning with one in each set. It will also be obvious that so far as certain features of the invention are concerned it will not be necessary to arrange the tubes in sets and operate the electrodes alternately, but that I could, for instance, employ a single tube and operate the same according to my invention. I prefer, however, to arrange the tubes in sets of two or more and operate the same alternately, for the reason that such operation affords greater rapidity in the production of the gaseous medium desired.

In practice I have used a dynamo designed to give out five amperes at five hundred volts and an induction-coil having an ohmic resistance of about one hundred ohms, said induction-coil comprising an iron core wound with No. 18 copper wire. With the particular form of apparatus herein described I have produced a gaseous medium of the character referred to with the voltage across the arc varying from one hundred and fifty volts to nine hundred volts and the current in the circuit of the arc varying from twenty amperes to one-tenth of an ampere. The particular limitations of voltage and current above referred to are by no means essential, since I have found that flour may be bleached and modified, as will hereinafter be described, with the voltage at the arc varying within the widest limits, and I believe that the same effects would be produced by the highest attainable voltage.

The valuable properties referred to as being possessed by the gaseous medium produced by this apparatus are those of whitening and purifying cereals and otherwise improving the quality thereof—that is to say, I have found that flour after being acted upon by the modified air—that is, air which has been acted upon by the spark or arc—is very noticeably bleached, presenting a dead-white color in contrast with the creamy yellow of the untreated flour. I have also found that when portions of the treated and untreated flours, equal by weight, are blended with equal quantities of distilled water the two doughs thus formed are very different in consistency, that from the treated flour being apparently drier and much more elastic than that from the untreated flour, the dough from the latter flour being "short"

and relatively non-elastic. When equal portions, by weight, of the two flours are blended with water sufficient to make a dough suitable for baking, it is found that the treated flour requires more water, from five to seven per cent. more. I also find that the treated and untreated flours from the same barrel when made into dough and baked will produce loaves of bread which upon being cut or broken show the same difference in color as was shown by the treated and untreated flours, the bread from the treated flour being much whiter.

Having thus fully described my invention, what I claim as new, and desire to secure by Letters Patent of the United States, is—

1. The method, which consists in generating gases from air by continuously bringing in contact and separating in the presence of air, to form arcs, two electrodes connected with a source of electricity, and withdrawing from the region of the arcs the gaseous medium generated thereby.

2. The method of generating a gaseous medium from air, which consists in continuously bringing in contact and separating in the presence of air, to form arcs, two electrodes connected with a source of electricity, and then short-circuiting said arcs.

3. The method of generating a gaseous medium which consists in alternately bringing in contact and separating two sets of electrodes connected with a source of electricity, and short-circuiting the arc formed in each set by the contact of the electrodes of the other set.

4. The method of generating a gaseous medium from air which consists in bringing in contact in the presence of air two electrodes connected with a source of electricity, separating said electrodes to form an arc, and automatically increasing the potential of the current by such separation.

5. The method of generating a gaseous medium from air which consists in bringing in contact in the presence of air two electrodes connected with a source of electricity, separating said electrodes to form an arc, and simultaneously with the separation of the electrodes increasing the potential of the current.

6. The method of generating a gaseous medium from air which consists in alternately bringing in contact and separating in the presence of air two sets of electrodes connected with a source of electricity whereby a series of arcs is generated, and withdrawing from the region of the arcs the gaseous medium generated.

7. The method of generating a gaseous medium from air which consists in alternately bringing in contact and separating in the presence of air two sets of electrodes connected with a source of electricity, whereby a series of arcs is generated, and short-circuiting such arcs at predetermined intervals.

8. The method of generating a gaseous medium from air, which consists in producing in a volume of air an electric arc, and continuously short-circuiting and reëstablishing such arc.

9. The method of generating a gaseous medium from air, which consists in producing in a volume of air an electric arc, by bringing in contact and separating two electrodes connected with a source of electricity and continuously dissipating and reëstablishing such arc, and automatically increasing the potential of the current coincident with the formation of the arc.

10. The method of generating a gaseous medium from air, which consists in continuously bringing in contact and separating in the presence of air, to form arcs of a given density, two electrodes connected with a source of electricity, and short-circuiting each arc while at its maximum density.

11. The method of generating a gaseous medium from air, which consists in continuously bringing in contact and separating in the presence of air, to form arcs, two electrodes connected with a source of electricity, maintaining the density of each arc without appreciable attenuation, and then short-circuiting said arc.

12. The method of generating a gaseous medium from air, which consists in continuously bringing into stationary contact and then separating in the presence of air, to form arcs, two electrodes connected with a source of electricity, increasing the potential of the current by the separation of the electrodes, and short-circuiting each arc before the density of the same is appreciably diminished.

13. The method of generating a gaseous medium from air, which consists in establishing in the presence of air an electric arc, maintaining said arc at a given density, and then short-circuiting it before the density of the same is appreciably diminished, and withdrawing from the region of the arc the air modified thereby.

14. The method of generating a gaseous medium from air, which consists in bringing in contact two electrodes connected with a source of electricity, separating said electrodes in the presence of air to form an arc, short-circuiting the arc while it is at its maximum density and withdrawing from the region of the arc the air modified thereby.

In testimony whereof I have hereunto set my hand in presence of two subscribing witnesses.

JAMES N. ALSOP.

Witnesses:
F. B. KEEFER,
GEO. W. REA.